(12) United States Patent
Sano et al.

(10) Patent No.: US 12,151,642 B2
(45) Date of Patent: Nov. 26, 2024

(54) WEBBING WINDING DEVICE AND VEHICLE SEAT

(71) Applicant: KABUSHIKI KAISHA TOKAI-RIKA-DENKI-SEISAKUSHO, Aichi (JP)

(72) Inventors: Chihiro Sano, Aichi (JP); Motoki Sugiyama, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 365 days.

(21) Appl. No.: 17/796,114

(22) PCT Filed: Jan. 12, 2021

(86) PCT No.: PCT/JP2021/000715
§ 371 (c)(1),
(2) Date: Jul. 28, 2022

(87) PCT Pub. No.: WO2021/157292
PCT Pub. Date: Aug. 12, 2021

(65) Prior Publication Data
US 2023/0087082 A1    Mar. 23, 2023

(30) Foreign Application Priority Data
Feb. 7, 2020   (JP) .................... 2020-019938

(51) Int. Cl.
*B60R 22/40*    (2006.01)
*B60R 22/343*    (2006.01)
*B60R 22/405*    (2006.01)

(52) U.S. Cl.
CPC .......... *B60R 22/405* (2013.01); *B60R 22/343* (2013.01)

(58) Field of Classification Search
CPC ...... B60R 22/40; B60R 22/343; B60R 22/405
See application file for complete search history.

(56) References Cited

U.S. PATENT DOCUMENTS 4,280,584 A * 7/1981 Makishima ........... B60R 22/343
  242/384
4,765,559 A * 8/1988 Crisp ...................... B60R 22/40
  242/384.5

(Continued)

FOREIGN PATENT DOCUMENTS

| CN | 110745099 A | 2/2020 |
| JP | 2002-234417 A | 8/2002 |
| JP | 2012-192854 A | 10/2012 |

*Primary Examiner* — Sang K Kim
(74) *Attorney, Agent, or Firm* — Studebaker & Brackett PC

(57) ABSTRACT

A webbing winding device includes a spool, a sensor lever, and a solenoid. The sensor lever is displaceable between the first position and the second position. In a state where the sensor lever is disposed at the first position, the rotation in the drawing-out direction of the spool is enabled, and in a state where the sensor lever is disposed at the second position, the rotation in the drawing-out direction of the spool is locked. When the solenoid is actuated, a part of the sensor lever is attracted and the sensor lever is displaced from the first position to the second position. The center of gravity of the sensor lever is set so that the sensor lever is displaced toward the second position when negative acceleration with respect to the direction in which a part of the sensor lever is attracted to the solenoid is generated in the sensor lever.

4 Claims, 9 Drawing Sheets

(56) References Cited

U.S. PATENT DOCUMENTS

| | | | |
|---|---|---|---|
| 6,732,969 B2 * | 5/2004 | Tanji | B60R 22/343 242/384.1 |
| 2002/0066818 A1 | 6/2002 | Tanji et al. | |
| 2013/0241187 A1 | 9/2013 | Baumgartner et al. | |
| 2020/0023809 A1 | 1/2020 | Yamamoto | |

* cited by examiner

WEBBING WINDING DEVICE AND VEHICLE SEAT

TECHNICAL FIELD

The present invention relates to a webbing winding device and a vehicle seat.

BACKGROUND ART

Japanese Patent Application Laid-Open (JP-A) No. 2012-192854 and Japanese Patent Application Laid-Open (JP-A) No. 2002-234417 disclose a webbing winding device including a lock mechanism that restricts drawing-out from a spool of a webbing in emergency of a vehicle, such as at the time of rapid deceleration of a vehicle.

In the lock mechanism of the webbing winding device (seat belt retractor) described in JP-A No. 2012-192854, an inertial ball moves at the time of rapid deceleration of a vehicle, whereby a lever is displaced and engaged with a lock gear. Accordingly, rotation of the spool is locked and drawing-out from the spool of the webbing is restricted.

In the lock mechanism of the webbing winding device (seat belt winding device) described in JP-A No. 2002-234417, a pawl is moved by an electric actuation of a motor to mesh with the teeth of a ratchet gear. Accordingly, the rotation of the ratchet gear is locked, and the drawing-out from the spool of the webbing (seat belt) is restricted.

SUMMARY OF INVENTION

Technical Problem

In view of the above facts, an object of the present invention is to obtain a webbing winding device and a vehicle seat capable of restricting drawing-out from a spool of a webbing in an emergency of a vehicle.

Solution to Problem

A webbing winding device according to a first aspect includes: a spool, a webbing to be attached to an occupant being wound around the spool, the spool being rotated in a drawing-out direction by the webbing being drawn out; a displacement member configured to be displaced between a first position and a second position, rotation in the drawing-out direction of the spool being enabled in a state in which the displacement member is disposed at the first position, and rotation in the drawing-out direction of the spool being locked in a state in which the displacement member is disposed at the second position; and an actuation portion, actuation of the actuation portion causing a part of the displacement member to be attracted to cause the displacement member to be displaced from the first position to the second position, wherein a center of gravity of the displacement member is set so that the displacement member is displaced toward the second position in a case in which negative acceleration with respect to a direction in which the part of the displacement member is attracted to the actuation portion is generated in the displacement member.

In the first aspect, a webbing winding device according to a second aspect further includes a member to be engaged, provided so as to be rotatable integrally with the spool, wherein regulation of rotation of the member to be engaged is configured to lock rotation in the drawing-out direction of the spool, and the displacement member being supported so as to be rotatable, wherein the displacement member is configured to include: an attracting portion, that is disposed facing the actuation portion, the attracting portion being attracted to the actuation portion in an actuated state, and an engagement portion that, in a case in which the attracting portion is attracted to the actuation portion, is directly or indirectly engaged with the member to be engaged to regulate rotation of the member to be engaged.

In a webbing winding device according to a third aspect, in the first aspect or the second aspect, wherein the center of gravity of the displacement member is set so that in a case in which acceleration in the intersecting direction and acceleration having a component in the direction in which the part of the displacement member is attracted to the actuation portion is generated in the displacement member, an inertial force such that the displacement member is displaced toward the first position acts on the displacement member, and the inertial force decreases as the crossing angle increases.

A vehicle seat includes: a seat cushion; a seat back that is configured to be reclined toward a seat rear side with respect to the seat cushion; and the webbing winding device according to any one of claims 1 to 3 fixed to the seat back, wherein the webbing winding device is fixed to the seat back so that an inertial force such that the displacement member is displaced toward the first position acts on the displacement member in a case in which an impact from the seat rear side to a front side is applied, and in such an orientation that the inertial force decreases as a reclining angle to the seat rear side with respect to the seat cushion of the seat back increases.

Advantageous Effects of Invention

In the webbing winding device according to the first aspect, when the actuation portion is actuated in an emergency of the vehicle, a part of the displacement member is attracted to the actuation portion. Accordingly, the displacement member is displaced from the first position to the second position, and the rotation in the drawing-out direction of the spool is locked. As a result, drawing-out from the spool of the webbing is restricted.

Here, in the webbing winding device according to the first aspect, the center of gravity of the displacement member is set so that the displacement member is displaced toward the second position when negative acceleration with respect to the direction in which a part of the displacement member is attracted to the actuation portion is generated in the displacement member. Therefore, for example, the webbing winding device according to the first aspect is fixed to the vehicle seat or the like in such an attitude that the negative acceleration is generated in the displacement member at the time of rapid deceleration of the vehicle. In this case, at the time of rapid deceleration of the vehicle, the displacement member can be displaced or urged toward the second position side by the inertial force acting on the displacement member. Accordingly, the drawing-out from the spool of the webbing can be restricted at the time of rapid deceleration of the vehicle.

In the webbing winding device according to the second aspect, when the actuation portion is actuated in an emergency of the vehicle, an attracting portion of the displacement member is attracted to the actuation portion. Accordingly, the displacement member is rotationally displaced from the first position to the second position, and the engagement portion of the displacement member is directly or indirectly engaged with the member to be engaged. When the engagement portion of the displacement member is directly or indirectly engaged with the member to be engaged, the rotation of the member to be engaged is regulated, and the rotation in the drawing-out direction of the spool is locked. As a result, drawing-out from the spool of the webbing is restricted.

In the webbing winding device according to the third aspect, when acceleration in the intersecting direction as well as acceleration having a component in a direction in which a part of the displacement member is attracted to the actuation portion is generated in the displacement member, an inertial force such that the displacement member is displaced toward the first position acts on the displacement member. The inertial force decreases as the crossing angle increases. Therefore, for example, the webbing winding device according to the third aspect is fixed to the seat back of the vehicle seat in an attitude such that acceleration having a component in a direction in which a part of the displacement member is attracted to the actuation portion is generated in the displacement member at the time of rear end collision of the vehicle and in an attitude such that the crossing angle increases as the reclining angle to the rear side with respect to the seat cushion of the seat back increases. In this configuration, as the reclining angle with respect to the seat cushion of the seat back increases, the inertial force toward the first position acting on the displacement member at the time of rear end collision of the vehicle can be reduced. That is, as the reclining angle with respect to the seat cushion of the seat back increases, the inertial force that hinders the displacement toward the second position of the displacement member at the time of rear end collision of the vehicle can be reduced.

DESCRIPTION OF EMBODIMENTS

A webbing winding device according to an embodiment of the present invention will be described with reference to FIGS. 1 to 4.

Figure 1:
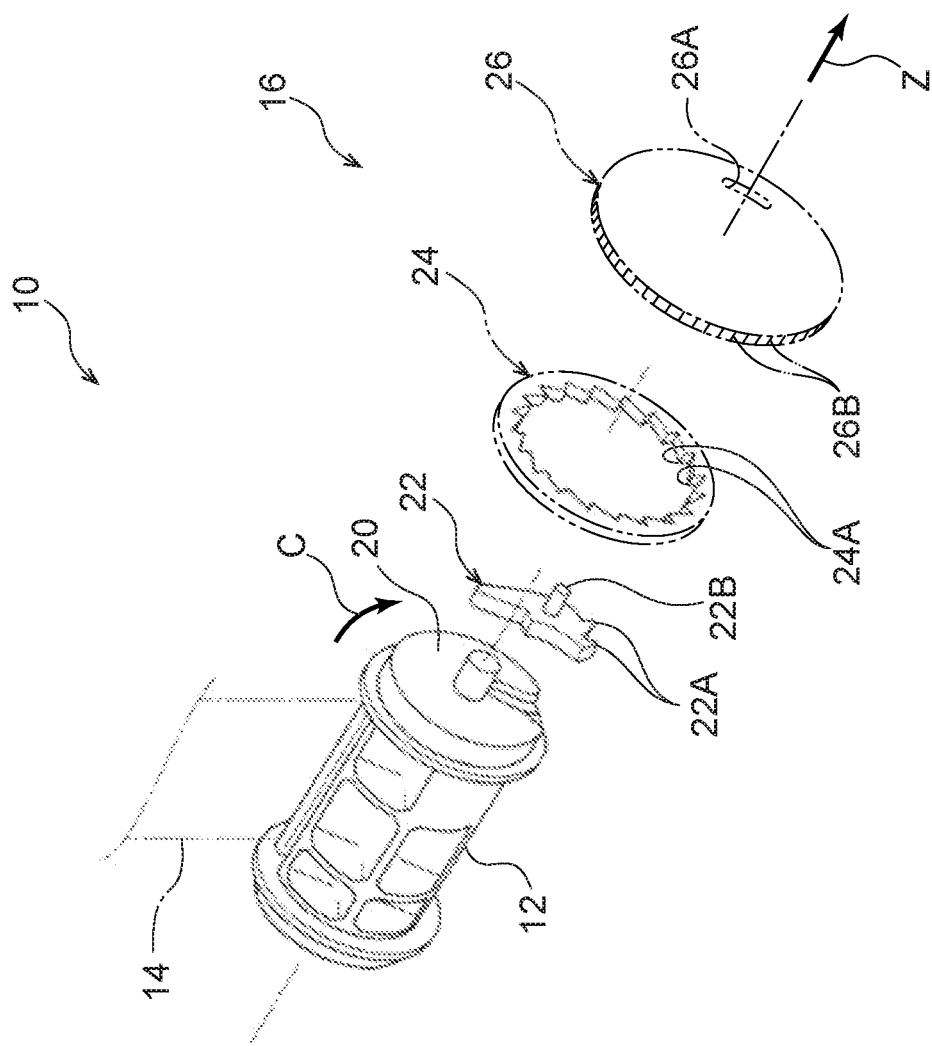
FIG. 1 is an exploded perspective view showing a spool, a main lock, and the like constituting a part of a webbing winding device.
Figure 2:
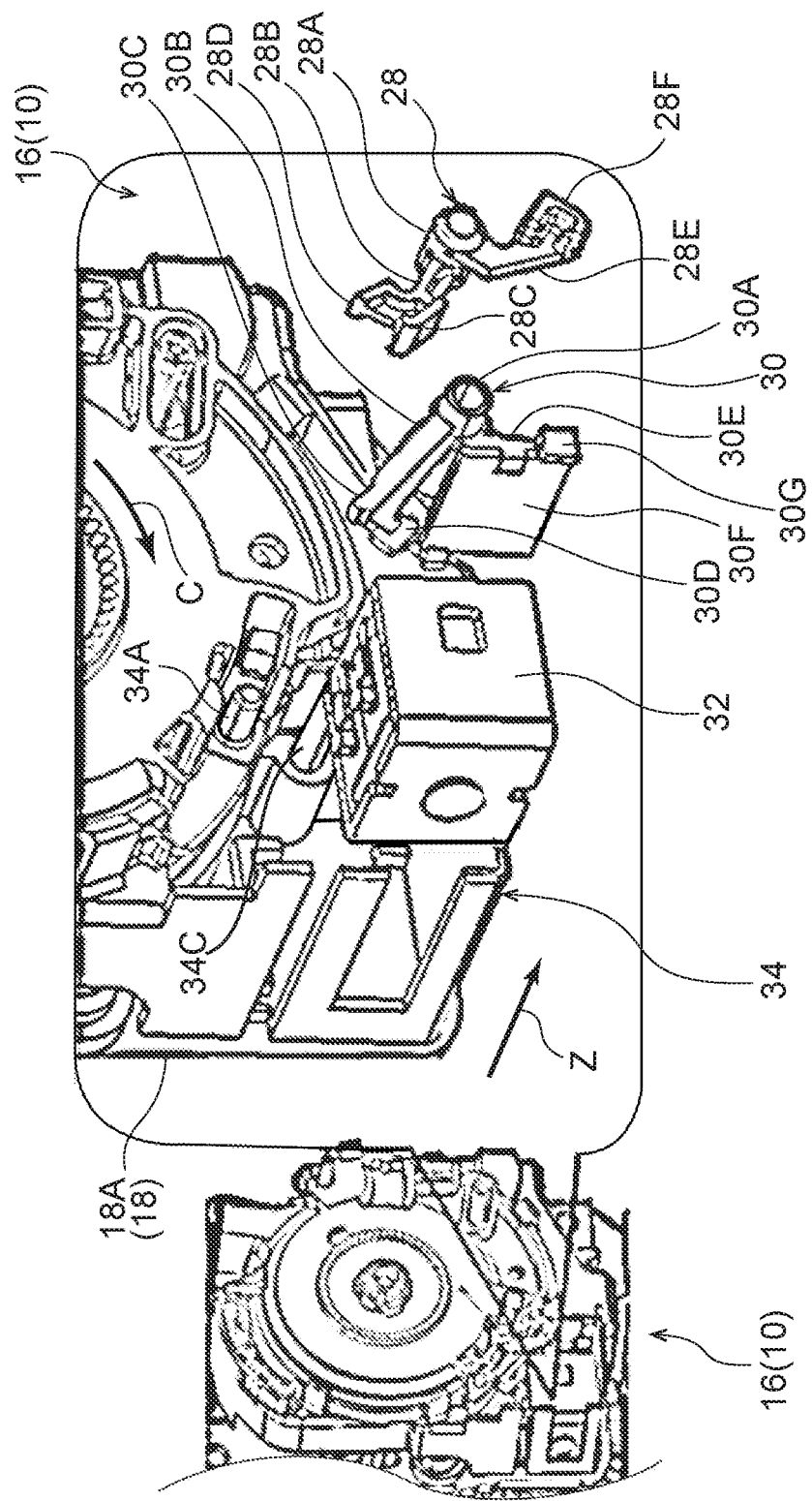
FIG. 2 is an exploded perspective view showing a solenoid, a sensor lever, a pawl, and the like constituting a part of a lock mechanism.

As shown in FIGS. 1 and 2, the webbing winding device 10 of the present embodiment includes a spool 12, a webbing 14, and a lock mechanism 16. Hereinafter, unless otherwise noted, when the axial direction, the radial direction, and the circumferential direction are simply indicated, the rotational axial direction, the rotational radial direction, and the rotational circumferential direction of the spool 12 are indicated.

As shown in FIG. 1, the spool 12 is formed in a substantially cylindrical shape. Between a pair of leg pieces 18A of a frame 18 (see FIG. 2), the spool 12 is rotatably supported by the frame 18. A known torsion shaft (not shown) constituting a force limiter mechanism is disposed inside the spool 12. A lock base 20 is provided on one side in the axial direction (arrow Z direction side) of the spool 12. The lock base 20 is coupled to the spool 12 through the torsion shaft. The spool 12 is rotationally urged in the winding direction by a winding urging mechanism (not shown).

The webbing 14 is attached to the body of an occupant seated on a vehicle seat, and has a base end portion, which is one end portion in the longitudinal direction, locked to the spool 12. The spool 12 is rotationally urged in a winding direction (direction of an arrow C in FIG. 1 and the like) being one rotation direction by an urging force of a spiral spring constituting a part of a winding urging mechanism. Then, the spool 12 is rotated in the winding direction, whereby the webbing 14 is wound around the spool 12 from the base end side. The webbing 14 is drawn out from the spool 12, whereby the spool 12 is rotated in a drawing-out direction (direction opposite to the arrow C in FIG. 1 and the like) being the other rotation direction.

Next, the lock mechanism 16 of the main part of the present embodiment will be described.

Figure 3:
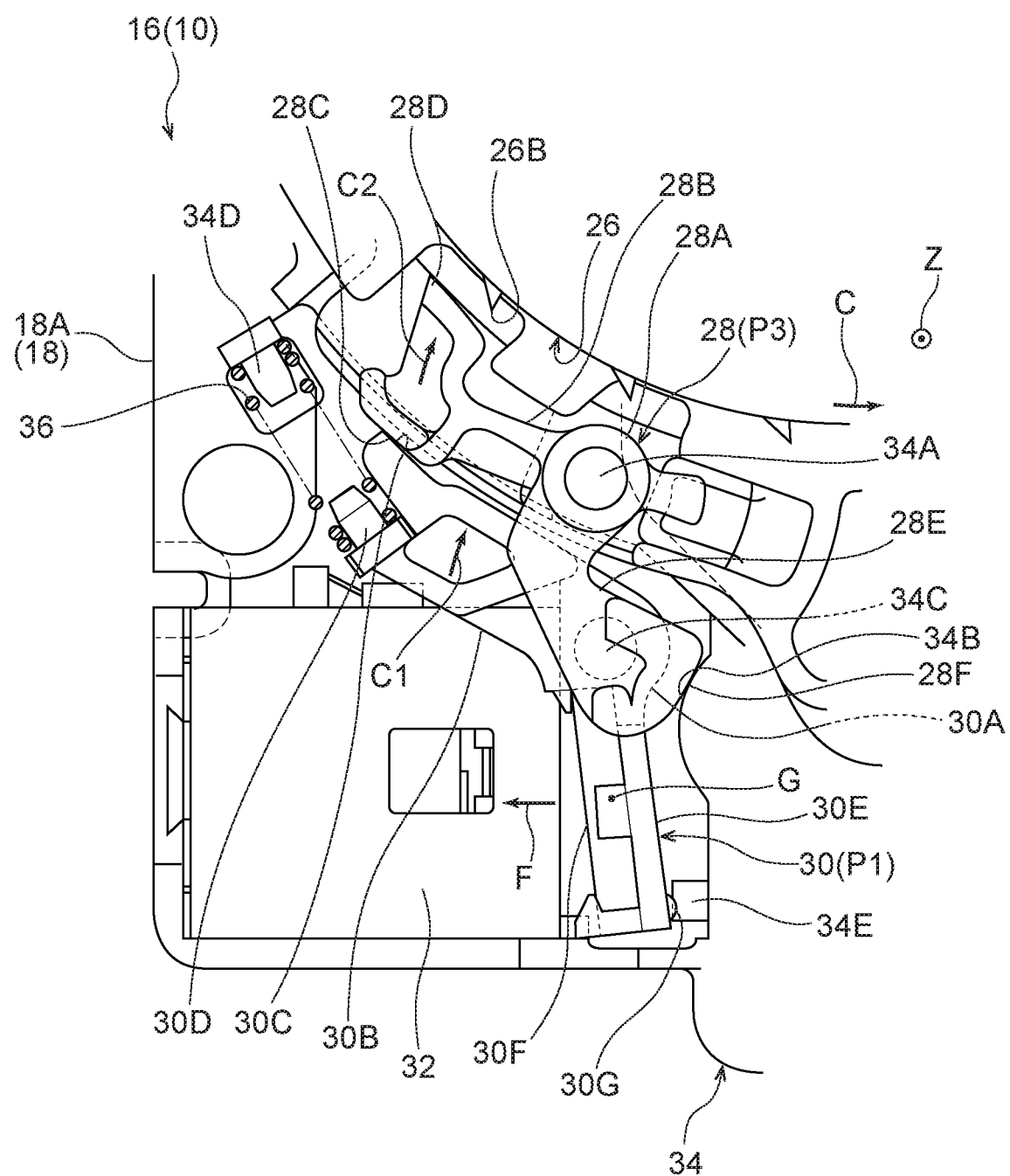
FIG. 3 is a side view showing a solenoid, a sensor lever, a pawl, and the like constituting a part of the lock mechanism, and shows a state in which the solenoid is stopped.

As shown in FIG. 1, the lock mechanism 16 includes a main lock 22 supported by the lock base 20 and a main lock engagement portion 24 with which the main lock 22 is engaged. The lock mechanism 16 includes a pawl engagement member 26 provided to be integrally rotatable with the spool 12. As shown in FIGS. 2 and 3, the lock mechanism 16 includes a pawl 28 and a sensor lever 30 disposed radially outside the pawl engagement member 26, and a solenoid 32 disposed to face the sensor lever 30.

As shown in FIG. 1, the main lock 22 is formed in a substantially rectangular block shape. The base end side of the main lock 22 is supported in a tiltable manner by a main lock support portion provided on the lock base 20. On the radially outer side on the tip side of the main lock 22, a main lock engaging tooth 22A to be engaged with a main lock tooth to be engaged 24A of the main lock engagement portion 24 described below is formed. Then, the main lock 22 is tilted (displaced) radially outward with the main lock support portion as a supporting shaft portion, whereby the main lock engaging tooth 22A is engaged with the main lock tooth to be engaged 24A of the main lock engagement portion 24. The main lock 22 is provided with a cylindrical protrusion 22B protruding toward one side in the axial direction.

The main lock engagement portion 24 is formed in an annular shape as an example, and a plurality of main lock tooth to be engaged 24A are formed along the circumferential direction in the inner circumferential portion of the main lock engagement portion 24. The main lock engagement portion 24 may be formed integrally with the frame 18 (see FIG. 2) that supports the spool 12, or may be provided separately from the frame 18.

The pawl engagement member 26 as a member to be engaged is formed in a disc shape. A radially central portion of the pawl engagement member 26 is rotatably supported by a torsion shaft (not shown) or a lock base 20. On the radially outer side of the portion supported by the torsion shaft (not shown) or the lock base 20 in the pawl engagement member 26, a long hole-shaped actuation groove 26A in which the protrusion 22B of the main lock 22 is disposed inside is formed. A plurality of pawl tooth to be engaged 26B with which a pawl engaging tooth 28D of the pawl 28 described below is engaged are formed along the circumferential direction in the outer circumferential portion of the pawl engagement member 26. The above-described pawl engagement member 26 is rotationally urged in the drawing-out direction with respect to the lock base 20 by a coil spring (not shown) provided between the pawl engagement member 26 and the lock base 20, and has the rotation by the coil spring in the drawing-out direction with respect to the lock base 20 locked.

As shown in FIG. 2, the pawl 28 is supported in a tiltable (rotationally displaceable) manner by the housing 34. The housing 34 is attached to the frame 18. A main lock engagement portion 24, a main lock 22, and the like (see FIG. 1) are disposed inside the housing 34.

Insertion of a cylindrical first supporting shaft portion 34A provided in the housing 34 causes the pawl 28 to include a tubular portion 28A rotatable about the first supporting shaft portion 34A as a rotation center. The pawl 28 includes a first arm portion 28B that protrudes from the other side in the axial direction (side opposite to the direction of arrow Z) of the tubular portion 28A toward the outer side in the radial direction of the tubular portion 28A. A pawl first abutting portion 28C on which a part of the first arm portion 30B abuts is formed on the first arm portion 30B side of the sensor lever 30 described below in the tip portion of the first arm portion 28B. On the side opposite to the pawl first abutting portion 28C in the tip portion of the first arm portion 28B, a pawl engaging tooth 28D to be engaged with a pawl tooth to be engaged 26B (see FIG. 3) of the pawl engagement member 26 is formed. The pawl 28 further includes a second arm portion 28E that protrudes from one axial side (arrow Z direction side) of the tubular portion 28A toward the radially outer side of the tubular portion 28A and the side opposite to the direction in which the first arm portion 28B protrudes. A pawl second abutting portion 28F which abuts on the housing first abutting portion 34B (see FIG. 3) of the housing 34 is formed in a tip portion of the second arm portion 28E.

Insertion of a cylindrical second supporting shaft portion 34C provided in the housing 34 causes the sensor lever 30 as a displacement member to include a tubular portion 30A rotatable about the second supporting shaft portion 34C as a rotation center. The sensor lever 30 includes a first arm portion 30B that protrudes from one side in the axial direction (arrow Z direction side) of the tubular portion 30A toward the outer side in the radial direction of the tubular portion 30A. On the pawl first abutting portion 28C side of the first arm portion 28B of the pawl 28 in the tip portion of the first arm portion 30B, a sensor lever first abutting portion 30C as an engagement portion abutting on the pawl first abutting portion 28C is formed. As shown in FIG. 3, a sensor lever-side spring locking portion 30D to which an end portion on one side of the return spring 36 is locked is formed on the side opposite to the sensor lever first abutting portion 30C in the tip portion of the first arm portion 30B. An end portion on the other side of the return spring 36 is locked to a housing-side spring locking portion 34D provided in the housing 34. Then, the return spring 36 is deformed along with the tilt of the sensor lever 30 (tilt toward a second position P2 described below), whereby the sensor lever 30 is urged toward a first position P1 described below.

As shown in FIG. 2, the sensor lever 30 includes a second arm portion 30E as an attracting portion that protrudes from the tubular portion 30A toward the radially outer side of the tubular portion 30A and the side opposite to the direction in which the first arm portion 30B protrudes. A plate 30F made of metal (for example, iron or steel) and formed in a rectangular plate shape is fixed to the solenoid 32 side described below in the second arm portion 30E. The plate 30F may be embedded inside the second arm portion 30E. As shown in FIG. 3, a sensor lever second abutting portion 30G abutting on the housing second abutting portion 34E of the housing 34 is formed in the tip portion of the second arm portion 30E and on one side in the axial direction (arrow Z direction side).

The solenoid 32 as an actuation portion generates a magnetic field when energized (actuated). As an example, the solenoid 32 is configured by winding a conducting wire around an iron core (a coil is formed around the iron core).

Then, as shown in FIG. 3, in a state where the solenoid 32 is not energized (the solenoid 32 is not actuated), the sensor lever 30 takes a predetermined attitude with respect to the housing 34. The position of the sensor lever 30 in this state is referred to as a first position P1. In a state where the sensor lever 30 is disposed at the first position P1, a state where the sensor lever first abutting portion 30C of the sensor lever 30 abuts on the pawl first abutting portion 28C of the pawl 28, and a state where the pawl second abutting portion 28F of the pawl 28 abuts on the housing first abutting portion 34B of the housing 34 are brought about, so that the pawl 28 takes a predetermined attitude with respect to the housing 34. The position of the pawl 28 in this state is referred to as an engagement-release position P3. In the state where the pawl 28 is positioned at the engagement-release position P3, the pawl engaging tooth 28D of the pawl 28 cannot engage with the pawl tooth to be engaged 26B of the pawl engagement member 26 (is separated from each other).

Figure 4:
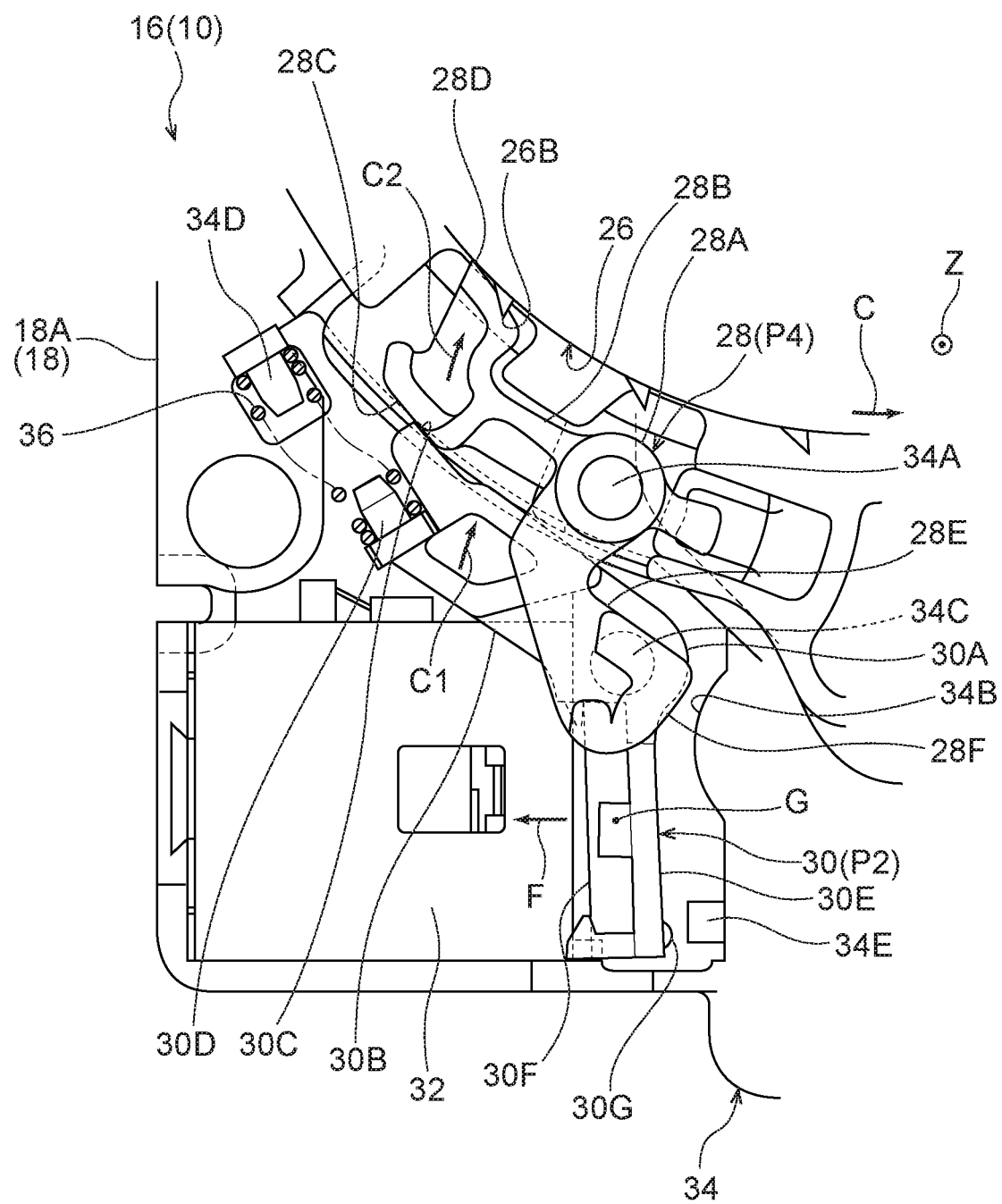
FIG. 4 is a side view showing a solenoid, a sensor lever, a pawl, and the like constituting a part of the lock mechanism, and shows a state in which the solenoid is actuated.

On the other hand, as shown in FIG. 4, when the solenoid 32 is actuated, the second arm portion 30E (plate 30F) of the sensor lever 30 is attracted to the solenoid 32, and the sensor lever 30 is tilted from the first position P1 to one side (arrow C1 direction side) around the second supporting shaft portion 34C. When the sensor lever 30 is tilted from the first position P1 to one side (arrow C1 direction side) around the second supporting shaft portion 34C, the sensor lever first abutting portion 30C of the first arm portion 30B of the sensor lever 30 presses the pawl first abutting portion 28C of the pawl 28. Accordingly, the pawl 28 is tilted from the engagement-release position P3 toward one side (arrow C2 direction side) around the first supporting shaft portion 34A, and the pawl engaging tooth 28D of the pawl 28 is engaged with the pawl tooth to be engaged 26B of the pawl engagement member 26. As a result, the rotation in the drawing-out direction (the drawing-out direction of the spool 12) of the pawl engagement member 26 is restricted (regulated). The position of the pawl 28 in a state where the pawl engaging tooth 28D of the pawl 28 can engage with the pawl tooth to be engaged 26B of the pawl engagement member 26 is referred to as an engaging position P4. The position of the sensor lever 30 in the state where the pawl 28 is positioned at the engaging position P4 is referred to as a second position P2.

A direction in which the solenoid 32 attracts the second arm portion 30E (plate 30F) of the sensor lever 30 is referred to as an attracting direction F. and is indicated by an arrow F. The attracting direction F is assumed to coincide with the direction from the N pole to the S pole or the direction from the S pole to the N pole which are the directions of the magnetic field generated by the solenoid 32.

In the present embodiment, the center of gravity G of the sensor lever 30 is set so that the sensor lever 30 is displaced toward the second position P2 when negative acceleration with respect to the attracting direction F is generated in the sensor lever 30. The center of gravity G is set in consideration of the material of the sensor lever 30, the protrusion amount of the first arm portion 30B or the second arm portion 30E from the tubular portion 30A, the weight of the plate 30F, and the like. In the present embodiment, the center of gravity G is positioned at a position corresponding to the plate 30F fixed to the second arm portion 30E.

Functions and Effects of Present Embodiment

Next, functions and effects of the present embodiment will be described.

As shown in FIG. 1, according to the webbing winding device 10 of the present embodiment, the webbing 14 is drawn out from the spool 12, whereby the webbing 14 is attached to the occupant seated on the vehicle seat.

Here, when a sensor or the like provided in the vehicle detects that the deceleration/acceleration of the vehicle including the webbing winding device 10 of the present embodiment exceeds the predetermined deceleration/acceleration (in an emergency or the like of the vehicle), the solenoid 32 is actuated as shown in FIG. 4. When the solenoid 32 is actuated, the second arm portion 30E (plate 30F) of the sensor lever 30 is attracted to the solenoid 32, and the sensor lever 30 is tilted from the first position P1 to the second position P2. When the sensor lever 30 is tilted from the first position P1 to the second position P2, the sensor lever first abutting portion 30C of the first arm portion 30B of the sensor lever 30 presses the pawl first abutting portion 28C of the pawl 28. Accordingly, the pawl 28 is tilted from the engagement-release position P3 toward the engaging position P4, and the pawl engaging tooth 28D of the pawl 28 is engaged with the pawl tooth to be engaged 26B of the pawl engagement member 26. As a result, the rotation in the drawing-out direction (the drawing-out direction of the spool 12) of the pawl engagement member 26 is restricted.

Then, as shown in FIGS. 1 and 4, when the body of the occupant seated on the vehicle seat moves to the seat front side due to the deceleration of the vehicle and the webbing 14 is drawn out from the spool 12, the spool 12 is rotated in the drawing-out direction together with the main lock 22. Accordingly, the protrusion 22B of the main lock 24 is moved along the actuation groove 26A of the pawl engagement member 26 whose rotation is restricted, and the main lock engaging tooth 22A of the main lock 22 is engaged with the main lock tooth to be engaged 24A of the main lock engagement portion 24. As a result, the rotation in the drawing-out direction of the spool 12 is restricted (locked), and the drawing-out from the spool 12 of the webbing 14 is restricted. Accordingly, the body of the occupant seated on the vehicle seat is restrained by the webbing 14.

Incidentally, in the webbing winding device 10 of the present embodiment, the center of gravity G of the sensor lever 30 is set so that the sensor lever 30 is displaced toward the second position P2 when negative acceleration with respect to the attracting direction F is generated in the sensor lever 30. Therefore, for example, the webbing winding device 10 is fixed to the vehicle seat or the like in such an attitude that the negative acceleration is generated in the sensor lever 30 at the time of rapid deceleration of the vehicle. In this case, at the time of rapid deceleration of the vehicle, the sensor lever 30 can be displaced or urged toward the second position P2 side by the inertial force acting on the sensor lever 30. This makes it possible to arrange the sensor lever 30 at the second position P2 or to easily tilt the sensor lever 30 to the second position P2 at the time of rapid deceleration of the vehicle. As a result, the drawing-out from the spool 12 of the webbing 14 can be more reliably restricted at the time of rapid deceleration of the vehicle. At the time of rapid deceleration of the vehicle, the sensor lever 30 can be displaced or urged toward the second position P2 by the inertial force acting on the sensor lever 30, so that the suction force (the force attracting the second arm portion 30E (plate 30F) of the sensor lever 30) of the solenoid 32 can be set small. Accordingly, the driving power of the solenoid 32 can be reduced.

(Structure of Providing Webbing Winding Device 10 in Seat Back 42 of Vehicle Seat 40)

Next, a structure of providing a webbing winding device 10 in a seat back 42 of a vehicle seat 40 will be described.

Figure 5:
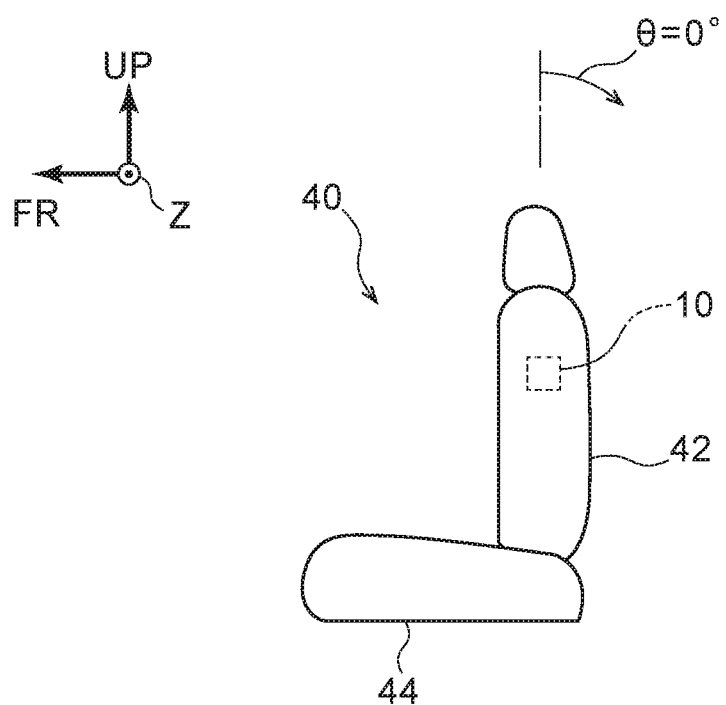
FIG. 5 is a side view showing a vehicle seat in which the webbing winding device is provided in a seat back, and shows a state in which a reclining angle of the seat back is set to 0°.
Figure 6:
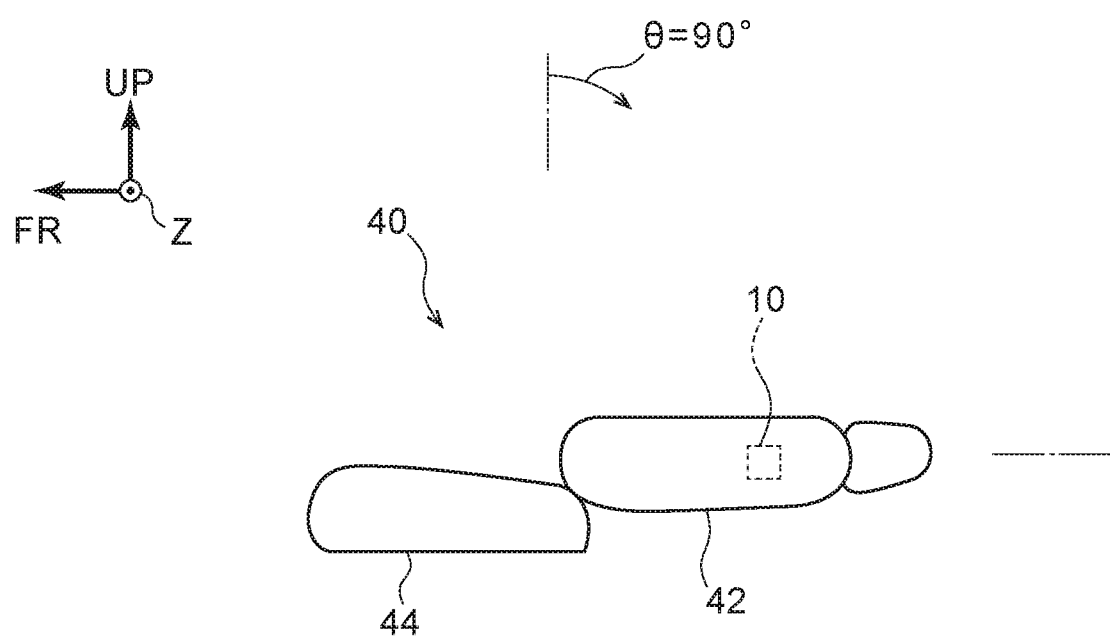
FIG. 6 is a side view showing a vehicle seat in which the webbing winding device is provided in a seat back, and shows a state in which a reclining angle of the seat back is set to 90°.

As shown in FIGS. 5 and 6, when the webbing winding device 10 described above is provided in the seat back 42 of the vehicle seat 40, the attitude of the webbing winding device 10 changes according to the reclining angle θ1 of the seat back 42. An arrow FR shown in the figures indicates the seat front side, and an arrow UP indicates the seat upper side. The seat front side and the seat upper side respectively coincide with the front side of the vehicle and the upper side of the vehicle.

Here, the reclining angle θ1 is a tilt angle toward the seat rear side with respect to the seat vertical direction of the seat back 42. Then, the reclining angle θ1 of the seat back 42 of the vehicle seat 40 shown in FIG. 5 is 0°. The reclining angle θ1 of the seat back 42 of the vehicle seat 40 shown in FIG. 6 is 90°.

Figure 7:
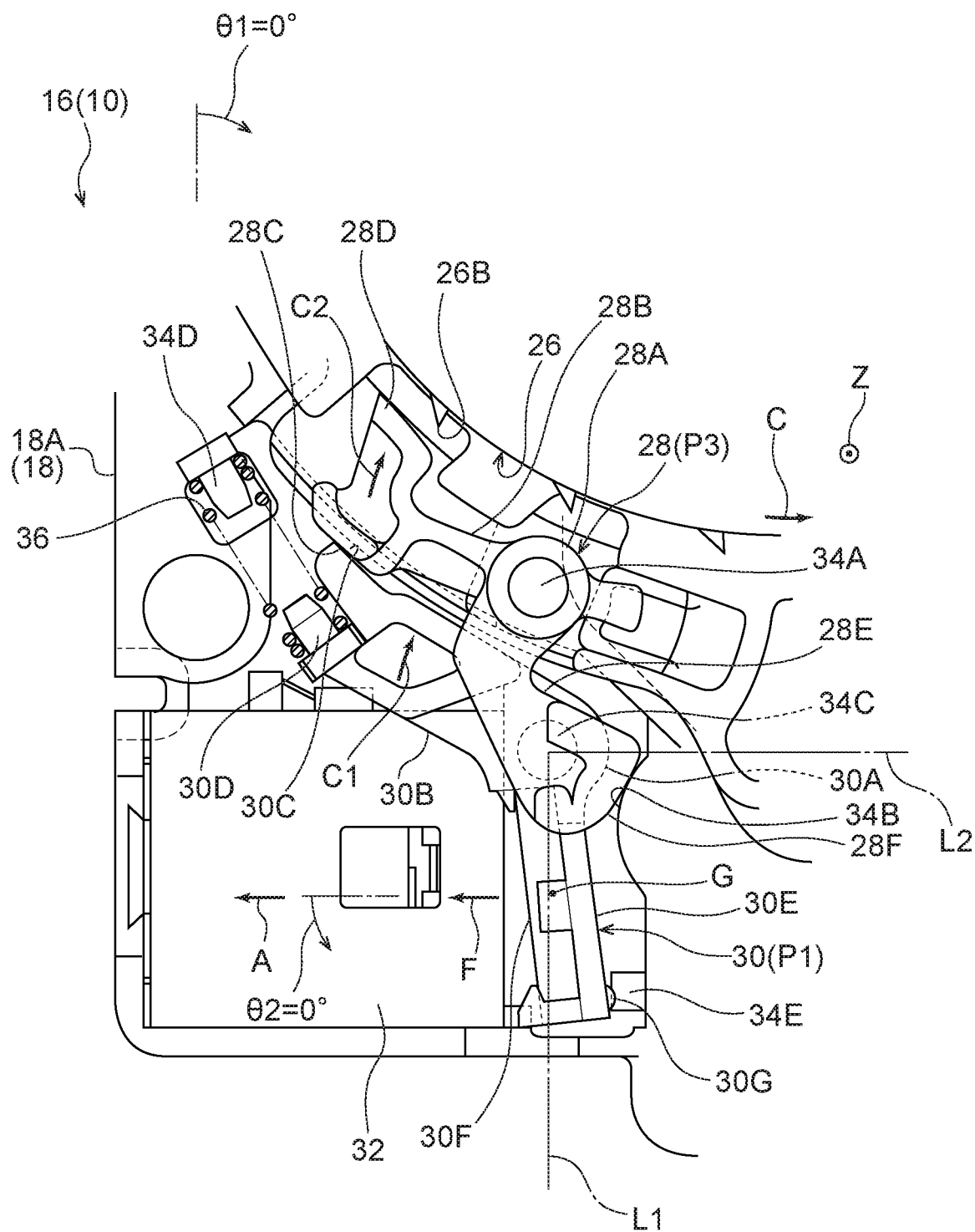
FIG. 7 is a side view showing a solenoid, a sensor lever, a pawl, and the like constituting a part of the lock mechanism, and shows a state in which the reclining angle of the seat back is set to 0°.
Figure 8:
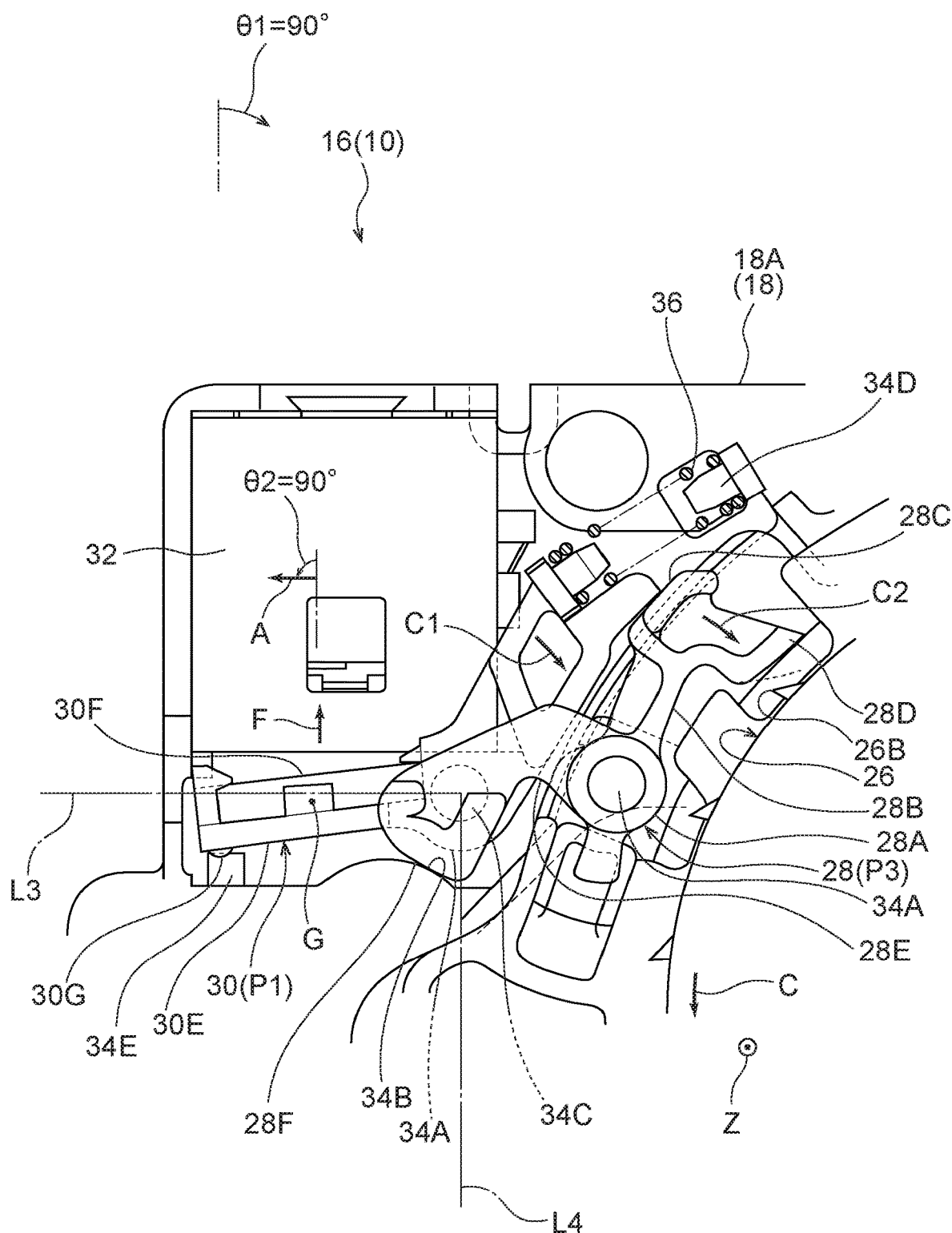
FIG. 8 is a side view showing a solenoid, a sensor lever, a pawl, and the like constituting a part of the lock mechanism, and shows a state in which the reclining angle of the seat back is set to 90°.

As shown in FIGS. 5 to 8, an angle formed by an attracting direction F and an intersecting direction A that intersects the attracting direction F in a state where the vehicle seat 40 is viewed from the seat-side side and in a state where the webbing winding device 10 is viewed from the axial direction is defined as a crossing angle θ2. Then, as shown in FIGS. 5 and 7, the webbing winding device 10 is fixed to the seat back 42 in an attitude in which the attracting direction F and the intersecting direction A coincide with each other in a state where the reclining angle θ1 of the seat back 42 is 0°. Assuming such a fixed state, in the webbing winding device 10 of the present embodiment, the center of gravity G of the sensor lever 30 is set so that, when the acceleration having a component in the attracting direction F (acceleration due to rear end collision described below) together with the acceleration in the intersecting direction A is generated in the sensor lever 30, an inertial force such that the sensor lever 30 is displaced toward the first position P1 acts on the sensor lever 30, and the inertial force decreases as the crossing angle θ2 increases. Specifically, as shown in FIG. 7, in a state where the reclining angle θ1 is 0°, the center of gravity G is set so that center of gravity G is positioned behind a line L1 passing through the center of rotation of the sensor lever 30 and extending in the seat vertical direction and below a line L2 passing through the center of rotation of the sensor lever 30 and extending in the seat front-rear direction. As shown in FIG. 8, in a state where the reclining angle θ1 is 90°, the center of gravity G is set so that center of gravity G is positioned below a line L3 passing through the center of rotation of the sensor lever 30 and extending in the seat front-rear direction and in front of a line L4 passing through the center of rotation of the sensor lever 30 and extending in the seat vertical direction. In order to reduce the influence of the moment of inertia, the center of gravity G is preferably set close to the rotation center of the sensor lever 30.

In the structure described above, the crossing angle θ2 increases as the reclining angle θ1 of the seat back 42 increases. Accordingly, as the reclining angle θ1 of the seat back 42 increases, the inertial force toward the first position P1 acting on the sensor lever 30 at the time of rear end collision of the vehicle can be reduced. That is, as the reclining angle θ1 of the seat back 42 increases, the inertial force that hinders the displacement toward the second position P2 of the sensor lever 30 at the time of the rear end collision of the vehicle can be reduced.

Figure 9:
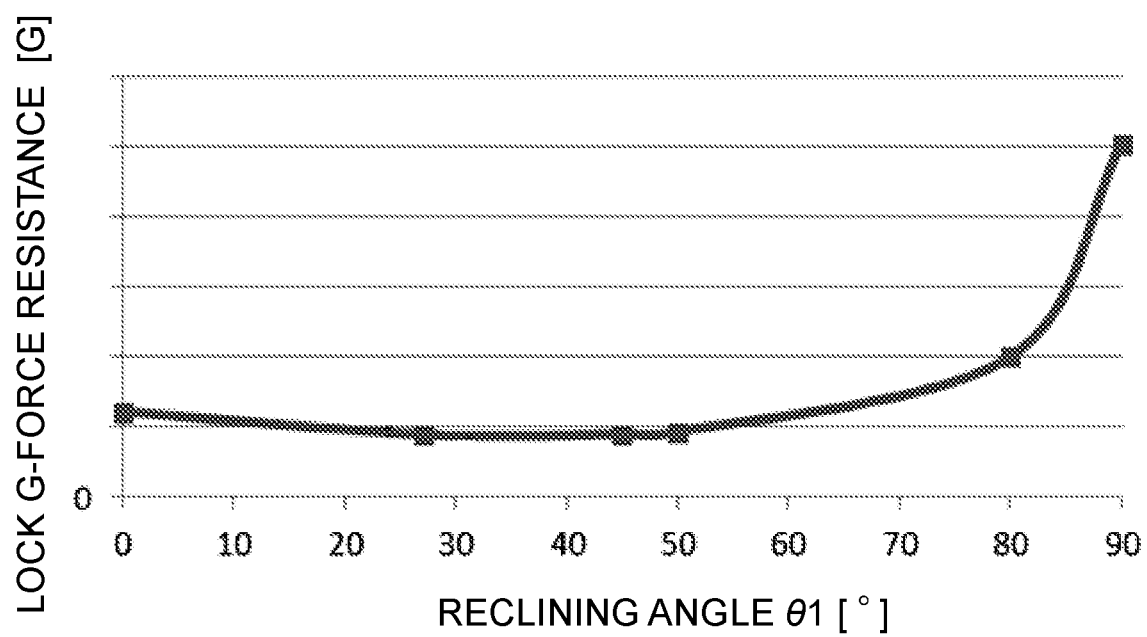
FIG. 9 is a graph showing a relationship between a reclining angle of a seat back and lock g-force resistance.

FIG. 9 shows a graph representing a relationship between the reclining angle θ1 of the seat back 42 and the lock g-force resistance. The lock g-force resistance is acceleration generated in the webbing winding device 10 (sensor lever 30) at the time of rear end collision of the vehicle, and is acceleration when the sensor lever 30 cannot be moved to the second position P2 even if the solenoid 32 is actuated in a state where the acceleration is generated. Then, as shown in FIG. 9, when the webbing winding device 10 of the present embodiment is fixed to the seat back 42 of the vehicle seat 40 in the above-described state, it can be seen that the lock g-force resistance can be increased as the reclining angle θ1 of the seat back 42 increases. That is, it can be seen that the inertial force that hinders the displacement toward the second position P2 of the sensor lever 30 at the time of rear end collision of the vehicle can be reduced.

In the webbing winding device 10 of the present embodiment described above, an example in which the pawl 28 is configured to be engaged with the pawl engagement member 26 along with the displacement of the sensor lever 30, that is, an example in which the sensor lever 30 is configured to be indirectly engaged with the pawl engagement member 26 through the pawl 28 has been described, but the present invention is not limited thereto. For example, the sensor lever 30 may be configured to be directly engaged with the pawl engagement member 26.

In the webbing winding device 10, an example in which the sensor lever 30 is configured to rotate (be rotationally displaced) has been described, but the present invention is not limited thereto. For example, the sensor lever 30 may be configured to be linearly displaced toward the pawl engagement member 26 side and the side opposite to this direction.

Although one embodiment of the present invention has been described above, the present invention is not limited to the above, and it is needless to say that various modifications other than the above can be made and implemented without departing from the gist of the present invention.

The disclosure of Japanese Patent Application No. 2020 019938 filed on Feb. 7, 2020 is incorporated herein by reference in its entirety.

The invention claimed is:

1. A webbing winding device comprising:
a spool, a webbing to be attached to an occupant being wound around the spool, the spool being rotated in a drawing-out direction by the webbing being drawn out;
a displacement member configured to be displaced between a first position and a second position, rotation in a drawing-out direction of the spool being enabled in a state in which the displacement member is disposed at the first position, and rotation in the drawing-out direction of the spool being locked in a state in which the displacement member is disposed at the second position; and
an actuation portion, actuation of the actuation portion causing a part of the displacement member to be attracted to cause the displacement member to be displaced from the first position to the second position,
wherein a center of gravity of the displacement member is set so that the displacement member is displaced toward the second position in a case in which negative acceleration with respect to a direction in which the part of the displacement member is attracted to the actuation portion is generated in the displacement member.

2. The webbing winding device according to claim 1, further comprising a member to be engaged, provided so as to be rotatable integrally with the spool, wherein regulation of rotation of the member to be engaged is configured to lock rotation in the drawing-out direction of the spool, and
the displacement member being supported so as to be rotatable,
wherein the displacement member is configured to include:
an attracting portion, that is disposed facing the actuation portion, the attracting portion being attracted to the actuation portion in an actuated state, and
an engagement portion that, in a case in which the attracting portion is attracted to the actuation portion, is directly or indirectly engaged with the member to be engaged to regulate rotation of the member to be engaged.

3. The webbing winding device according to claim 1, wherein an angle formed by the direction in which the part of the displacement member is attracted to the actuation portion and an intersecting direction is defined as a crossing angle, and
wherein the center of gravity of the displacement member is set so that in a case in which acceleration in the intersecting direction and acceleration having a component in the direction in which the part of the displacement member is attracted to the actuation portion is generated in the displacement member, an inertial force such that the displacement member is displaced toward the first position acts on the displacement member, and the inertial force decreases as the crossing angle increases.

4. A vehicle seat comprising:
a seat cushion;
a seat back that is configured to be reclined toward a seat rear side with respect to the seat cushion; and
the webbing winding device according to claim 1 fixed to the seat back,
wherein the webbing winding device is fixed to the seat back so that an inertial force such that the displacement member is displaced toward the first position acts on the displacement member in a case in which an impact from the seat rear side to a front side is applied, and in such an orientation that the inertial force decreases as a reclining angle to the seat rear side with respect to the seat cushion of the seat back increases.

* * * * *